(12) United States Patent
Wu et al.

(10) Patent No.: US 9,500,323 B2
(45) Date of Patent: Nov. 22, 2016

(54) LENS FOR LED ILLUMINATION

(71) Applicant: OSRAM GmbH, Munich (DE)

(72) Inventors: Kongyi Wu, Guangdong (CN); Qihui Zhang, Guangdong (CN); HongWei Zhang, Guangdong (CN); Yusheng Ming, Guangdong (CN)

(73) Assignee: Osram GmbH, Munich (DE)

( * ) Notice: Subject to any disclaimer, the term of this patent is extended or adjusted under 35 U.S.C. 154(b) by 0 days.

(21) Appl. No.: 14/410,112

(22) PCT Filed: Jun. 28, 2013

(86) PCT No.: PCT/EP2013/063589
§ 371 (c)(1),
(2) Date: Dec. 22, 2014

(87) PCT Pub. No.: WO2014/001484
PCT Pub. Date: Jan. 3, 2014

(65) Prior Publication Data
US 2015/0276146 A1    Oct. 1, 2015

(30) Foreign Application Priority Data

Jun. 29, 2012   (CN) .......................... 2012 1 0226698

(51) Int. Cl.
*F21K 99/00* (2016.01)
*F21V 7/00* (2006.01)
(Continued)

(52) U.S. Cl.
CPC ............... *F21K 9/50* (2013.01); *F21S 48/1154* (2013.01); *F21V 5/04* (2013.01); *F21V 7/0091* (2013.01);
(Continued)

(58) Field of Classification Search
CPC .......... F21K 9/50; F21V 7/0091; F21V 5/04; F21V 5/005; F21S 48/1154; G02B 19/0028; G02B 19/0061; G02B 19/0066
See application file for complete search history.

(56) References Cited

U.S. PATENT DOCUMENTS 5,813,743 A * 9/1998 Naka .................... F21S 48/1329
                                              362/16
7,641,365 B2 * 1/2010 Katzir ................ G02B 19/0028
                                              359/708
(Continued)

FOREIGN PATENT DOCUMENTS

WO       2011076214 A1    6/2011

OTHER PUBLICATIONS

International Search Report and Written Opinion issued in PCT/EP2013/063589 on Sep. 23, 2013.

Primary Examiner — Renee Chavez
Assistant Examiner — Colin Cattanach
(74) *Attorney, Agent, or Firm* — Viering, Jentschura & Partner mbB

(57) ABSTRACT

A lens may include a light incident surface, a first light emergent surface and side surfaces joining the light incident surface and the first light emergent surface. The light incident surface defines a space for accommodating light sources. The side surface includes at least one total-internal reflection surface and at least one second light emergent surface, a first part of light passing through the light incident surface is refracted by the first light emergent surface and emerges to generate first emergent light, a second part of light passing through the light incident surface is reflected by the total-internal reflection surfaces to the first light emergent surface and is refracted by the first light emergent surface and emerges to generate second light emergent light, and a third part of light passing through the light incident surface is refracted by the second light emergent surfaces and emerges to generate third emergent light.

17 Claims, 4 Drawing Sheets

(51) Int. Cl.
  *F21V 5/00* (2015.01)
  *F21S 8/10* (2006.01)
  *F21V 5/04* (2006.01)
  *G02B 19/00* (2006.01)
  *F21Y 101/02* (2006.01)

(52) U.S. Cl.
  CPC ....... G02B 19/0028 (2013.01); G02B 19/0061 (2013.01); *F21Y 2101/02* (2013.01); *G02B 19/0066* (2013.01)

(56) References Cited

U.S. PATENT DOCUMENTS

| | | | | |
|---|---|---|---|---|
| 7,837,359 B2* | 11/2010 | Danek | .................. | F21V 5/04 362/309 |
| 2005/0265041 A1* | 12/2005 | Wimbert | ................ | F21S 48/215 362/545 |
| 2008/0043466 A1* | 2/2008 | Chakmakjian | .......... | F21V 5/007 362/237 |
| 2008/0231772 A1* | 9/2008 | Hung | ................... | F21V 5/04 349/65 |
| 2009/0168414 A1* | 7/2009 | Bailey | .................... | F21V 5/002 362/231 |
| 2009/0268455 A1* | 10/2009 | Allegri | .................... | F21K 9/00 362/235 |
| 2010/0027256 A1* | 2/2010 | Kinoshita | ................. | F21V 5/04 362/235 |
| 2010/0208490 A1* | 8/2010 | Tsuchiya | .............. | G02B 6/0096 362/606 |
| 2010/0327302 A1 | 12/2010 | Wang et al. | | |
| 2011/0026247 A1 | 2/2011 | Zhang et al. | | |

* cited by examiner

LENS FOR LED ILLUMINATION

RELATED APPLICATIONS

The present application is a national stage entry according to 35 U.S.C. §371 of PCT application No.: PCT/EP2013/063589 filed on Jun. 28, 2013, which claims priority from Chinese application No.: 201210226698.X filed on Jun. 29, 2012, and is incorporated herein by reference in its entirety.

TECHNICAL FIELD

Various embodiments relate to a lens, an illuminating device including such lens and a light box.

BACKGROUND

With the development of LED illumination technology, LED illuminating devices are used more and more in various environments. In order to improve the optical efficiency and to realize predetermined light-distribution pattern, an LED illuminating device is usually equipped with a lens for light sources. In a commonly used light box, a lens having a strip profile covers light sources in a linear arrangement and is mounted together with the light sources in a box-shaped transparent housing, especially at the bottom of the housing. Such lens preferably is a total-internal reflection lens (TIR). Light emitted from the light sources can, for instance, strike on the top of the housing from the bottom, and part of light can strike on side walls of the housing. Such light box is particularly suited for realizing decorative illumination, for instance, used as advertisement light box.

However, since the lens installed at the bottom of the light box is usually configured as a total-internal reflection lens, light emitted from the light sources only can strike on the top of the light box through a lens surface used as a light emergent surface. For an area from the lens surface to the top of the light box, such conventional total-internal reflection lens leads to low luminance in the bottom region of the light box, and a shadowed region at the bottom of the light box can be seen obviously as viewed from outside of the light box. Based on such illumination effect, aesthetics and applicability of the light box are affected to different degrees.

SUMMARY

Various embodiments provide a lens, through which incident light can be refracted to different directions to realize uniform illumination effect.

Various embodiments provide a lens. The lens includes a light incident surface, a first light emergent surface and side surfaces joining the light incident surface and the first light emergent surface, wherein the light incident surface defines a space for accommodating light sources, characterized in that respective side surface includes at least one total-internal reflection surface and at least one second light emergent surface, a first part of light passing through the light incident surface is refracted by the first light emergent surface and emerges to generate first emergent light, a second part of light passing through the light incident surface is reflected by the total-internal reflection surfaces to the first light emergent surface and is refracted by the first light emergent surface and emerges to generate second light emergent light, and a third part of light passing through the light incident surface is refracted by the second light emergent surfaces and emerges to generate third emergent light.

In various embodiments, the prior concept of using all side surfaces of a lens as total-internal reflection surfaces is discarded, while some side surfaces preferably are retained as total-internal reflection surfaces and the other side surfaces are configured as light emergent surfaces that can refract light towards both sides of the lens. That is to say, the lens according to various embodiments not only includes a first emergent surface in the center but also includes at least one second emergent surface at both sides of the first emergent surface. Incident light from the light sources can pass through the first and second emergent surfaces to strike towards different directions. Emergent light not only includes a first part of emergent light through, e.g. the first light emergent surface as lens top surface, in the direction of the optical axis, but also includes a second part of emergent light through the second light emergent surfaces on side surfaces of the lens at both sides of the optical axis. The first and second parts of emergent light extends in longitudinal and horizontal illumination areas of the lens, respectively, to enable outer surfaces of the lens to transmit light omnidirectionally, and then the second part of emergent light refracted from the side surfaces can be particularly used to illuminate the bottom region of the lens. Uniform light-distribution pattern can be obtained by using such lens.

According to various embodiments, the plurality of total-internal reflection surfaces are arranged to be spaced apart from each other, and adjacent total-internal reflection surfaces define the second light emergent surfaces therebetween. For the sake of uniform light-distribution effect, a plurality of (or as many as is possible) total-internal reflection surfaces and the second light emergent surfaces can be in a staggered arrangement according to practical situations to form side surfaces of the lens. Accordingly, while a part of incident light can be assured to be reflected by the total-internal reflection surfaces to the first light emergent surface, the other part of incident light also can pass through the second light emergent surface to be refracted uniformly by side surfaces of the lens.

According to various embodiments, the plurality of total-internal reflection surfaces are spline-curve sections intercepted in sequence in cross section from a spline curve from the light incident surface to the first light emergent surface. The "cross section" in the present context refers to a plane simultaneously perpendicular to the first light emergent surface and a plane where the optical axis is located. A curve formed by connecting in sequence a plurality of lines, which are expressing the total-internal reflection surface, in cross section is a spline curve.

According to various embodiments, respective second light emergent surface in cross section is a groove recessed away from an optical axis in a direction perpendicular to the optical axis. It can be seen from the cross section that respective second light emergent surface has a curved profile protruding from inside to outside in a lateral direction of the lens, and the curved profile forms a groove with respect to the optical axis. According to requirements of practical application, height and width of the groove can be adjusted to obtain corresponding illumination effect.

According to various embodiments, respective second light emergent surface includes a transmission portion parallel to the optical axis and a joining portion perpendicular to the optical axis. The transmission portion and the joining portion are connected with each other and thus define a right angle. Herein the transmission portion is an optical surface of the second light emergent surface for refracting incident light, and the joining portion is configured only in structure for joining the transmission portion with its adjacent total-internal reflection surface and does not change optical pathways of incident light.

According to various embodiments, the light incident surface has an arc-shaped first incident surface and second incident surfaces joining the first incident surface and the side surfaces, and the first incident surface and the second incident surfaces define a cavity recessed towards the first light emergent surface in a direction of the optical axis. Linear light sources are arranged in the recessed cavity defined by the light incident surface, and light emitted from the linear light sources can be collected as much as is possible using the cavity, and the light reaches the first incident surface in the center and the second incident surfaces at both sides of the first incident surface. A part of light having a small angle with the optical axis strikes on the first incident surface configured to be circular arc and directly emerges through the first light emergent surface in convergence. The other part of light having a big angle with the optical axis strikes on the second incident surfaces, and is reflected by and transmits through two opposite side surfaces of the lens, and then a part of reflected light converges towards the optical axis and emerges through the first light emergent surface. According to different application situations, the converging degree of emergent light can be changed by adjusting a distance between the lens and an object to be illuminated and curve profiles of the light incident surface and side surfaces of the lens, and therefore, strip light-distribution patterns with different widths and luminance are obtained.

According to various embodiments, the first incident surface in cross section is circular arc. Preferably, the first incident surface in cross section is a spline curve. Through the first incident surface having such profile, light striking on the lens can converge towards the optical axis and arrives at the first light emergent surface.

According to various embodiments, respective second incident surface defines a cylinder symmetrical with respect to the optical axis.

According to various embodiments, the lens is elongated and symmetrical with respect to a plane where the optical axis is located. As a result, symmetrical and uniform light-distribution patterns can be obtained through the symmetrical configuration of the lens.

Preferably, a joining surface parallel to the light emergent surface between the light incident surface and respective side surface is provided.

According to various embodiments, the first light emergent surface is a planar surface perpendicular to the optical axis. By configuring the first light emergent surface as a planar surface, light can highly effectively emerge, preventing occurrence of, e.g. reflection and refraction, on the uneven light emergent surface.

Various embodiments further relate to an illuminating device, including light sources, and the lens mentioned above, wherein the lens defines a space for accommodating the light sources. Preferably, the light sources of the illuminating device are LED chips.

In addition, various embodiments further relate to a light box including box-shape light-transmission housing, and further including the above illuminating device, wherein the lens is elongated and the light sources are light sources in linear arrangement. Such light box can realize uniform illumination, and particularly, shadowed region with low luminance will not appear at the bottom of the light box where the light sources are mounted.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

In the following detailed description, reference is made to the accompanying drawings, which form a part hereof, and in which is shown by way of illustration specific embodiments in which the invention may be practiced. In this regard, directional terminology, such as "top", "bottom", "inner", "outer", is used in reference to the orientation of the figures being described. Because components of embodiments of the present invention can be positioned in a number of different orientations, the directional terminology is used for purposes of illustration and is in no way limiting. It is to be understood that other embodiments may be utilized and structural or logical changes may made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
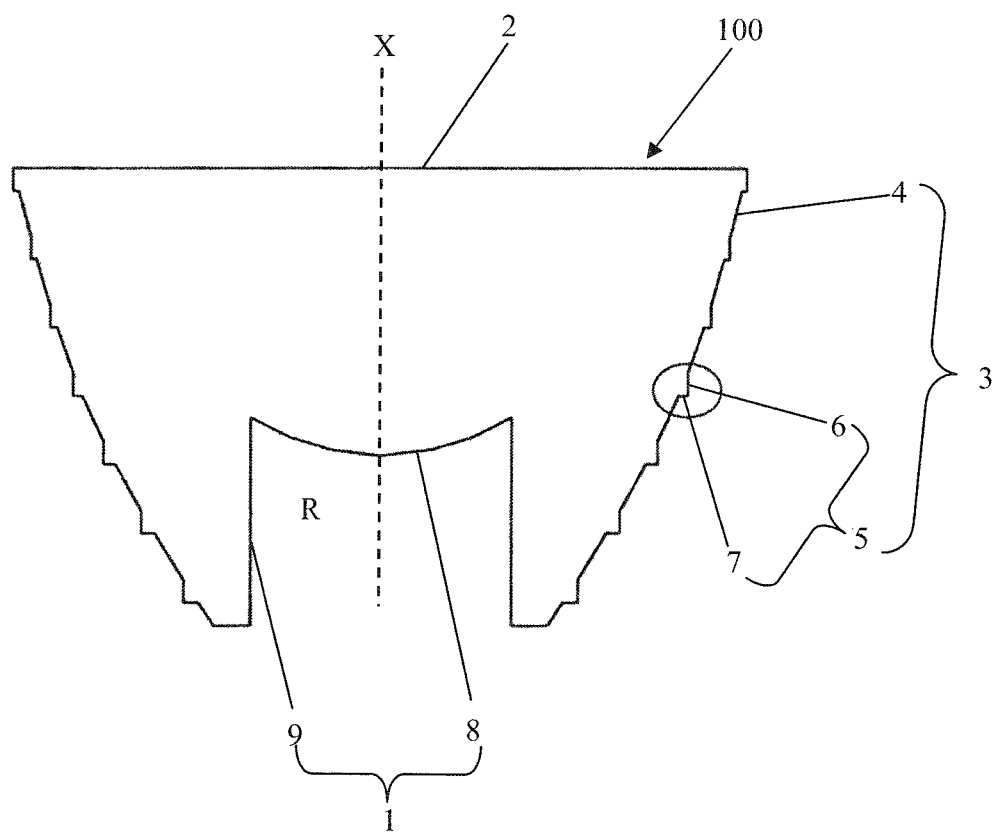
FIG. 1 is a cross-sectional view of a lens according to various embodiments.

FIG. 1 is a cross-sectional view of a lens according to the present disclosure. It can be seen from FIG. 1 that a lens 100 has a light incident surface 1, a first light emergent surface 2 and two side surfaces 3 joining the light incident surface 1 and the first light emergent surface 2, wherein the two side surfaces 3 opposite to each other substantially extend symmetrically in a form of spline curve. In accordance with the present disclosure, respective side surface 3 is configured to be formed by at least one (a plurality of, in the present embodiment) total-internal reflection surface 4 and at least one (a plurality of, in the present embodiment) second light emergent surface 5 joined therewith. And then light emergent surfaces in different directions, particularly perpendicular to a direction of an optical axis X, and emergent surfaces in two lateral directions for the incident light for obtaining uniform light-distribution patterns.

It can be seen further from the cross-sectional view of FIG. 1 that the circled curved line is the second light emergent surface 5 particularly configured according to the present disclosure. The two total-internal reflection surfaces 4 respectively joining two ends of the second light emergent surface 5 are spline-curve sections. Respective second light emergent surface 5 is formed by a transmission portion 6 parallel to the optical axis X and a joining portion 7 perpendicular to the optical axis X, and then a right-angle groove recessed away from the optical axis X is formed in the direction perpendicular to the optical X. The right-angle groove, with respect to the adjacent total-internal reflection surfaces 4, has a profile protruding outwardly from the lens 100.

The light incident surface 1 is configured as a curved surface for receiving incident light as much as is possible. The light incident surface 1 as shown in FIG. 1 includes a first incident surface 8 in the center and second incident surfaces 9 extending downwardly parallel to the optical axis X at both sides thereof. The first incident surface 8 in cross section is configured to be circular-arc shape or spline-curve shape for directly converging the incident light. In addition, for preventing light loss, the second incident surfaces 9 surrounding the first incident surface 8 are configured as cylindrical curved surfaces, and they define, together with the first incident surface 8, a cavity R for accommodating light sources.

The first light emergent surface 2 is a planar surface perpendicular to a surface where the optical axis X is located, i.e. a top surface of the lens 10. Since there is no uneven structure on the first light emergent surface 2, reflection and refraction caused thereby can be avoided so that light emerges highly-effectively and uniformly through the first light emergent surface 2. A joining surface 10, i.e. a bottom surface of the lens 100, parallel to the first light emergent surface, is present between the light incident surface 1 and respective side surface 3.

Figure 2:
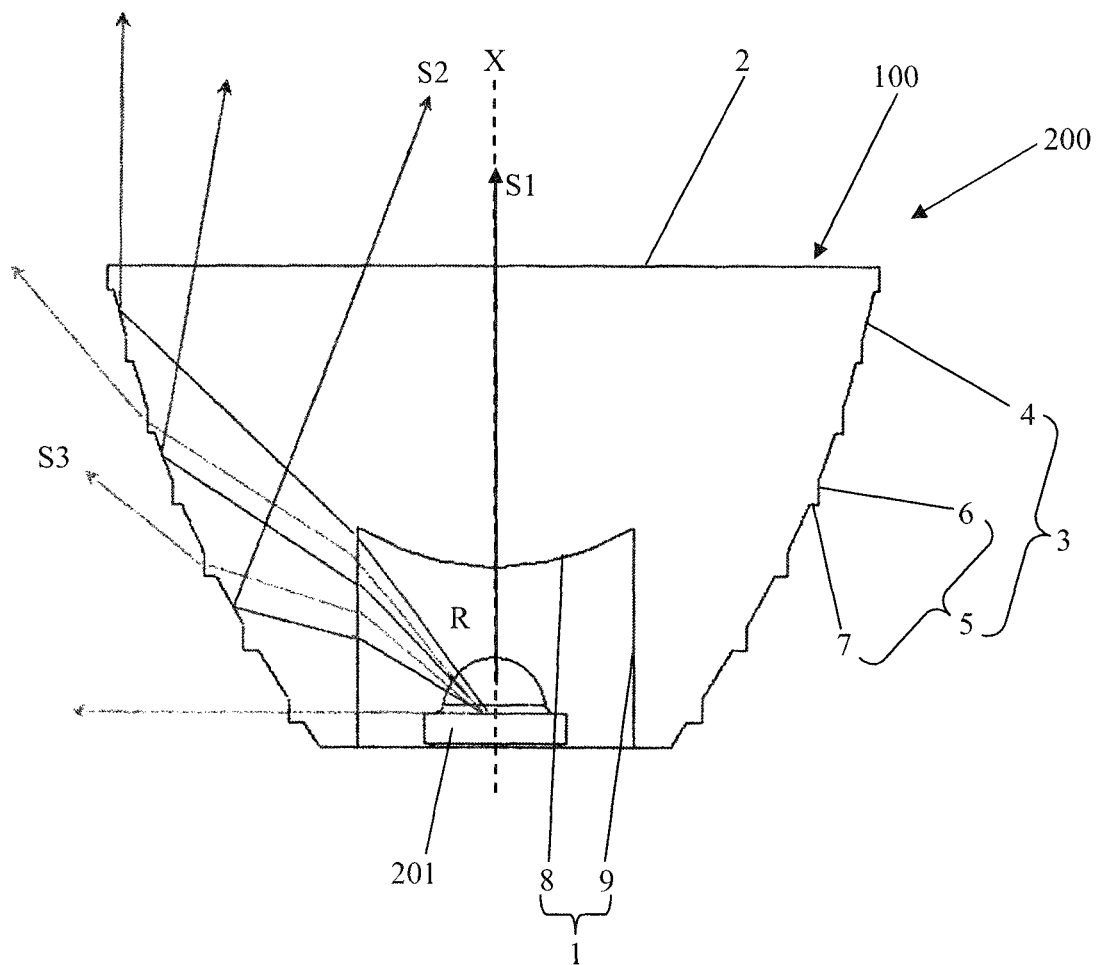
FIG. 2 is a cross-sectional view of an illuminating device according to various embodiments.

FIG. 2 is a cross-sectional view of an illuminating device according to the present disclosure, wherein optical pathways of incident light from light sources 201 through the lens 100 are schematically shown. The light sources 201 arranged in the cavity R emit incident light towards the first incident surface 8 and the second incident surfaces 9. In a perpendicular direction, a first part of light entering the lens 100 through the first incident surface 8 is refracted by the first light emergent surface 2 along the optical axis X in a converging manner to form first emergent light S1. In a horizontal direction, light entering the lens 100 through the second incident surfaces 9 is refracted to different regions of the side surfaces 3: a part of light strikes on the total-internal reflection surfaces 4 and reflected to the first light emergent surface 2 to thus form second emergent light S2 substantially converging towards the optical axis X; and the other part of light strikes on the second light emergent surfaces 5 in staggered arrangement with the total-internal reflection surfaces 4 to form third emergent light S3. As respective second light emergent surface 5 includes the transmission portion 6 parallel to the optical axis X, the transmission portion 6 can enable received light to emerge in a lateral direction of the lens 100. Based on the special structure of the lens 100, the illuminating device 100 is allowed to have uniform and large-area illumination effect.

Of course, desired light-distribution patterns can be obtained by adjusting the profile of the lens according to requirements in practical situation. For instance, the profile of respective side surface 3, especially lengths in cross sections of the transmission portion 6 and the joining portion 7 that define the right-angle groove, can be changed to adjust emergent angle and optical density of light refracted by the side surfaces 3 of the lens 100. As a result, light-distribution patterns with adjustable width and luminance can be obtained.

The lens 100 as shown in FIG. 1 and FIG. 2 can have a strip profile. Such lens is particularly adaptive to the light sources 201 in a linear arrangement.

Figure 3:
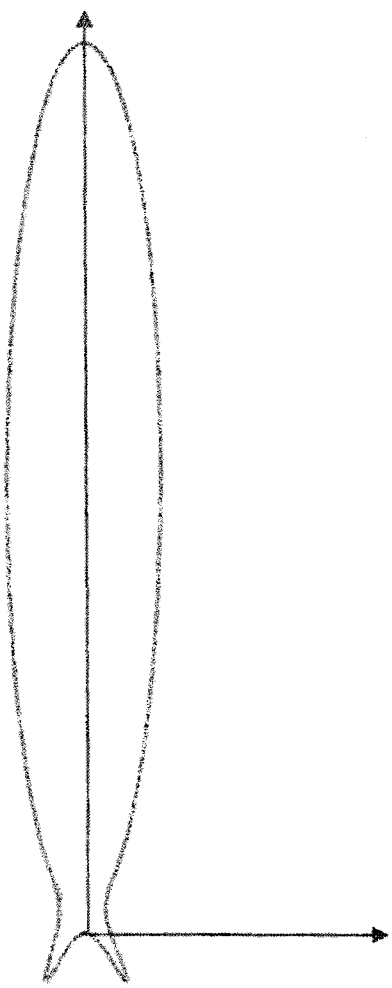
FIG. 3 is a light-distribution diagram of the illuminating device according to various embodiments.

In combination with the light-distribution pattern of the illuminating device 200 as shown in FIG. 3, it can be seen that the illuminating device 200, starting from origin, i.e. starting from a point where the light sources are located, not only can realize longitudinal uniform light-distribution upwardly, but also can realize uniform light-distribution downwardly from the origin, i.e. in a bottom region of the illuminating device 200 as shown in FIG. 2. Accordingly, luminance in the bottom region of the illuminating device 200 can be improved.

Figure 4:
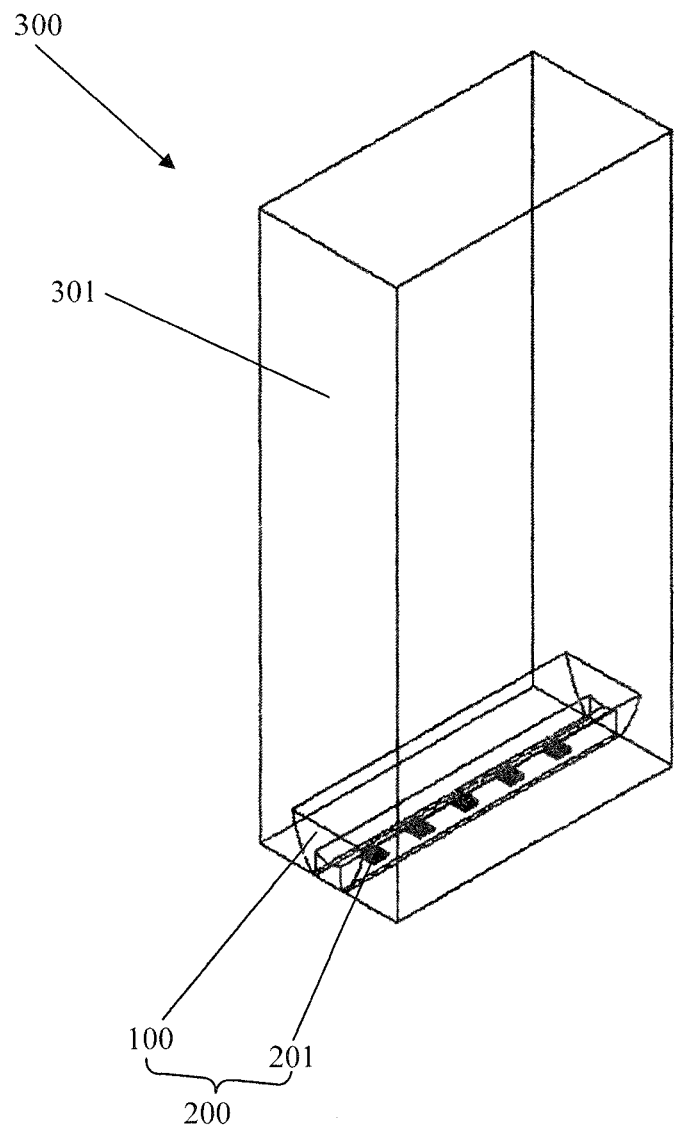
FIG. 4 is a 3D schematic diagram of a light box according to various embodiments.

FIG. 4 is a 3D schematic diagram of a light box according to the present disclosure. A light box 300 includes a light-transmission housing 301 having a cubic profile and the illuminating device 200 installed at a bottom of the light-transmission housing 301. The lens 100 configured to be strip-shaped covers the light sources 201 in a linear arrangement to constitute the illuminating device 200.

The light sources 201 can be LED chips within the scope of the present disclosure, and then the illuminating device 200 and the light box 300 have the advantages of high efficiency and energy-saving.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A lens, comprising:
   a light incident surface,
   a first light emergent surface and
   side surfaces facing away from an optical axis in a direction perpendicular to the optical axis, the side surfaces joining the light incident surface and the first light emergent surface,
   wherein the light incident surface defines a space for accommodating light sources,
   wherein each side surface comprises at least one total-internal reflection surface and at least one second light emergent surface, a first part of light passing through the light incident surface is refracted by the first light emergent surface and emerges to generate first emergent light, a second part of light passing through the light incident surface is reflected by the total-internal reflection surfaces to the first light emergent surface and is refracted by the first light emergent surface and emerges to generate second emergent light, and a third part of light passing through the light incident surface is refracted by the second light emergent surfaces and emerges to generate third emergent light,
   wherein a plurality of total-internal reflection surfaces are spaced apart from each other, and adjacent total-internal reflection surfaces define the second light emergent surfaces therebetween,
   wherein a cross sectional shape of each second light emergent surface is a groove recessed away from an optical axis in a direction perpendicular to the optical axis,
   wherein respective second light emergent surface comprises a transmission portion parallel to the optical axis and a joining portion perpendicular to the optical axis.

2. The lens according to claim 1,
wherein any of the total-internal reflection surfaces are spline-curve sections intercepted in sequence in cross section from a spline curve from the light incident surface to the first light emergent surface.

3. The lens according to claim 1,
wherein the light incident surface has an arc-shaped first incident surface and second incident surfaces joining the first incident surface and the side surfaces, and the first incident surface and the second incident surfaces define a cavity recessed towards the first light emergent surface in a direction of the optical axis.

4. The lens according to claim 3,
wherein a cross-sectional shape of the first incident surface is a circular arc.

5. The lens according to claim 3,
wherein a cross-sectional shape of the first incident surface is a spline curve.

6. The lens according to claim 3,
wherein respective second incident surface defines a cylinder symmetrical with respect to the optical axis.

7. The lens according to claim 1,
wherein the lens is elongated and symmetrical with respect to a plane where the optical axis is located.

8. The lens according to claim 1,
further comprising joining surface parallel to the first light emergent surface between the light incident surface and each side surface.

9. The lens according to claim 1,
wherein the first light emergent surface is a planar surface perpendicular to the optical axis.

10. An illuminating device, comprising light sources, and a lens,
the lens comprising:
a light incident surface,
a first light emergent surface, and
side surfaces facing generally away from an optical axis in a direction perpendicular to the optical axis, the side surfaces joining the light incident surface and the first light emergent surface,
wherein the light incident surface defines a space for accommodating light sources,
wherein each side surface comprises at least one total-internal reflection surface and at least one second light emergent surface, wherein a first part of light passing through the light incident surface is refracted by the first light emergent surface and emerges to generate first emergent light, a second part of light passing through the light incident surface is reflected by the total-internal reflection surfaces to the first light emergent surface and is refracted by the first light emergent surface and emerges to generate second emergent light, and a third part of light passing through the light incident surface is refracted by the second light emergent surfaces and emerges to generate third emergent light,
wherein a plurality of total-internal reflection surfaces are spaced apart from each other, and adjacent total-internal reflection surfaces define the second light emergent surfaces therebetween,
wherein a cross sectional shape of each second light emergent surface is a groove recessed away from an optical axis in a direction perpendicular to the optical axis,
wherein respective second light emergent surface comprises a transmission portion parallel to the optical axis and a joining portion perpendicular to the optical axis.

11. The illuminating device according to claim 10, wherein the light sources are LED chips.

12. A lens, comprising:
a light incident surface,
a first light emergent surface and
side surfaces joining the light incident surface and the first light emergent surface, wherein the light incident surface defines a space for accommodating light sources,
wherein each side surface comprises at least one total-internal reflection surface and at least one second light emergent surface, a first part of light passing through the light incident surface is refracted by the first light emergent surface and emerges to generate first emergent light, a second part of light passing through the light incident surface is reflected by the total-internal reflection surfaces to the first light emergent surface and is refracted by the first light emergent surface and emerges to generate second emergent light, and a third part of light passing through the light incident surface is refracted by the second light emergent surfaces and emerges to generate third emergent light;
wherein a plurality of total-internal reflection surfaces are spaced apart from each other, and adjacent total-internal reflection surfaces define the second light emergent surfaces therebetween;
wherein a cross sectional shape of each second light emergent surface is a groove recessed away from an optical axis in a direction perpendicular to the optical axis; and
wherein respective second light emergent surface comprises a transmission portion parallel to the optical axis and a joining portion perpendicular to the optical axis.

13. The lens according to claim 12,
wherein the light incident surface has an arc-shaped first incident surface and second incident surfaces joining the first incident surface and the side surfaces, and the first incident surface and the second incident surfaces define a cavity recessed towards the first light emergent surface in a direction of the optical axis.

14. The lens according to claim 13,
wherein a cross-sectional shape of the first incident surface is a circular arc.

15. The lens according to claim 13,
wherein a cross-sectional shape of the first incident surface is a spline curve.

16. The lens according to claim 13,
wherein respective second incident surface defines a cylinder symmetrical with respect to the optical axis.

17. The lens according to claim 12,
wherein the first light emergent surface is a planar surface perpendicular to the optical axis.

* * * * *